(12) United States Patent
Osborne

(10) Patent No.: US 12,339,216 B2
(45) Date of Patent: Jun. 24, 2025

(54) LINEAR VARIABLE OPTICAL FILTER SYSTEMS FOR FLOW CYTOMETRY AND METHODS FOR USING THE SAME

(71) Applicant: Becton, Dickinson and Company, Franklin Lakes, NJ (US)

(72) Inventor: Geoffrey Osborne, Bellbowrie (AU)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 195 days.

(21) Appl. No.: 18/142,767

(22) Filed: May 3, 2023

(65) Prior Publication Data

US 2023/0384204 A1 Nov. 30, 2023

Related U.S. Application Data

(60) Provisional application No. 63/346,722, filed on May 27, 2022.

(51) Int. Cl.

| | |
|---|---|
| *G01N 15/14* | (2024.01) |
| *G01J 1/58* | (2006.01) |
| *G01N 15/1434* | (2024.01) |
| *G02B 5/20* | (2006.01) |
| *G02B 5/28* | (2006.01) |

(Continued)

(52) U.S. Cl.
CPC ............ *G01N 15/1434* (2013.01); *G01J 1/58* (2013.01); *G02B 5/203* (2013.01); *G02B 5/288* (2013.01); *G01J 2001/4453* (2013.01); *G01N 2015/1019* (2024.01)

(58) Field of Classification Search
CPC ........ G02B 5/201; G02B 5/203; G02B 5/288; G01J 1/58; G01J 2001/4453; G01N 15/1434; G01N 2015/1019
See application file for complete search history.

(56) References Cited

U.S. PATENT DOCUMENTS

| | | |
|---|---|---|
| 2005/0105077 A1 | 5/2005 | Padmanabhan et al. |
| 2006/0244947 A1 | 11/2006 | Rowe et al. |

(Continued)

FOREIGN PATENT DOCUMENTS

| | | |
|---|---|---|
| WO | WO2021224900 A2 | 11/2021 |

*Primary Examiner* — Kevin K Pyo
(74) *Attorney, Agent, or Firm* — Khin K. Chin; Bret E. Field; BOZICEVIC, FIELD & FRANCIS LLP

(57) ABSTRACT

Aspects of the present disclosure include systems for detecting light from a particle in a flow stream by spectral discrimination. Light detection systems according to certain embodiments include a wavelength separator component configured to propagate light between a first set of linear variable optical filters and a second set of linear variable optical filters where each set of linear variable optical filters is configured to pass light having predetermined sub-spectral ranges and a plurality of photodetectors positioned to detect light from each sub-spectral range across the linear variable optical filters. Systems having a light source for irradiating a particle in a flow stream and a photodetector modulator component for binning data signals generated in a plurality of photodetector channels of the light detection system are also described. Methods for detecting light with the subject systems and kits having one or more components for detecting light according to the subject methods are also provided.

20 Claims, 9 Drawing Sheets

(51) Int. Cl.
　　　*G01J 1/44*　　　(2006.01)
　　　*G01N 15/10*　　(2006.01)

(56) References Cited

U.S. PATENT DOCUMENTS

| | | | |
|---|---|---|---|
| 2011/0290982 A1* | 12/2011 | Boutami | G02B 5/201 |
| | | | 359/578 |
| 2015/0044098 A1 | 2/2015 | Smart et al. | |
| 2016/0299058 A1 | 10/2016 | Li et al. | |
| 2020/0300699 A1* | 9/2020 | Moggridge | G01J 3/0218 |

* cited by examiner

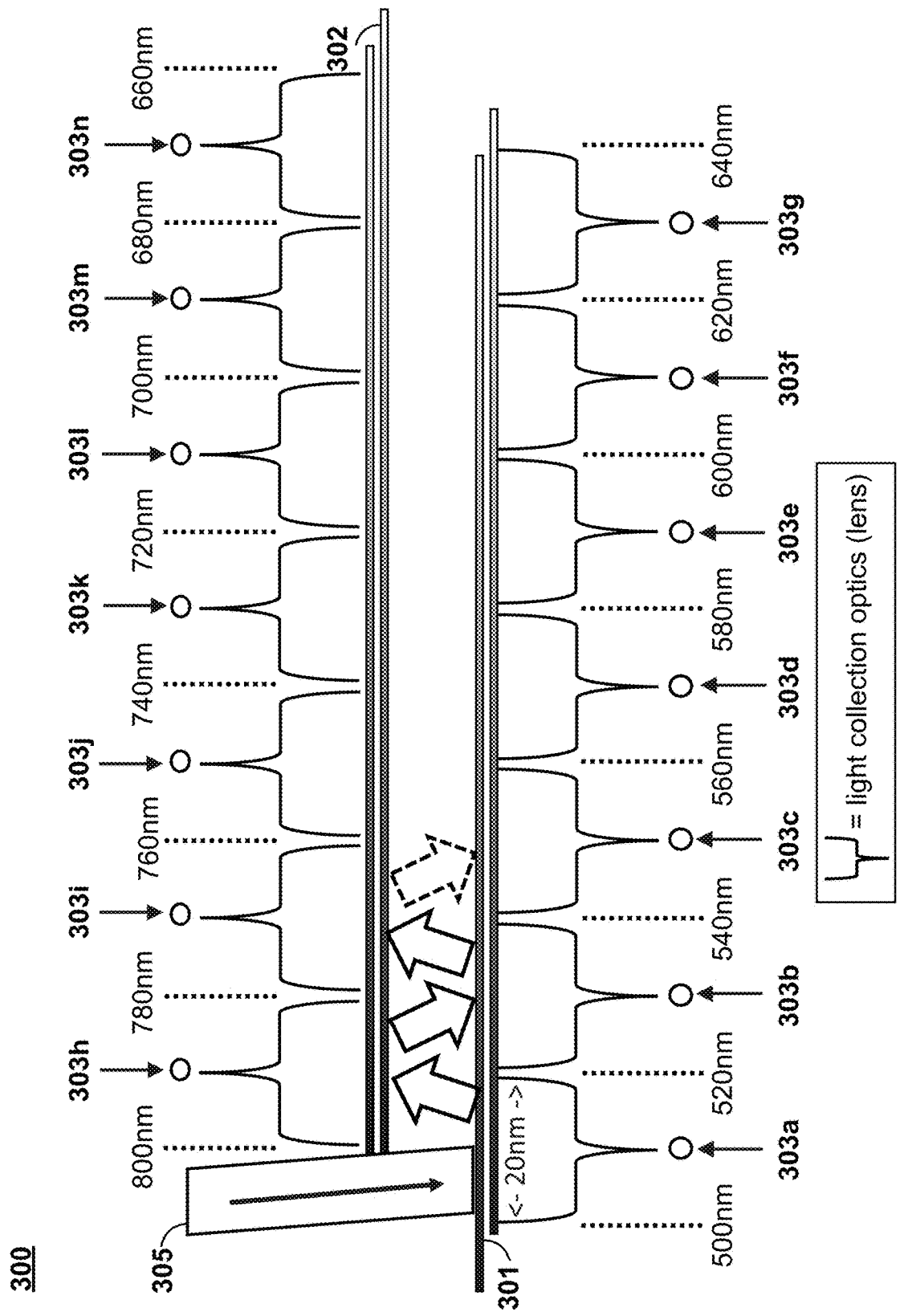

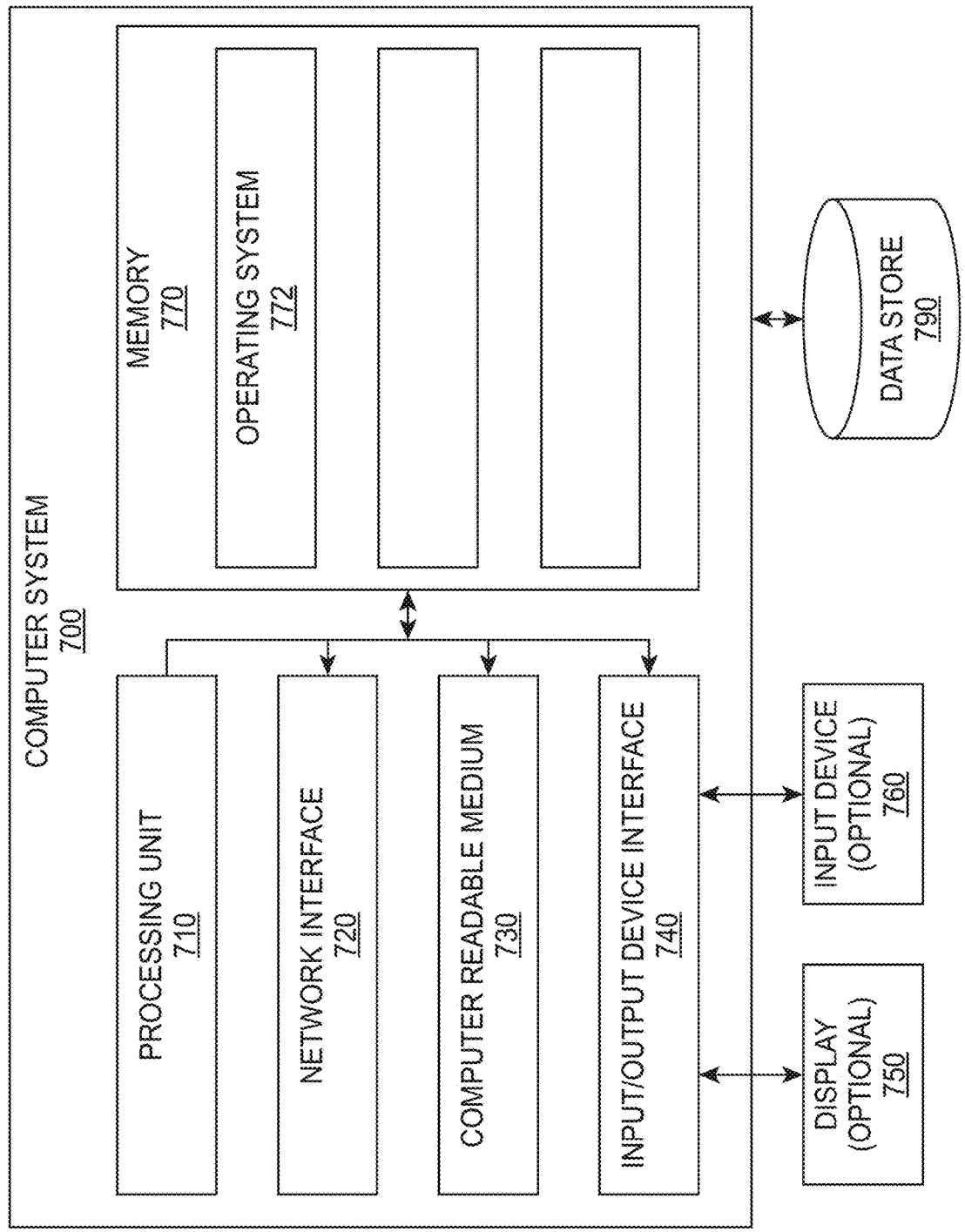

LINEAR VARIABLE OPTICAL FILTER SYSTEMS FOR FLOW CYTOMETRY AND METHODS FOR USING THE SAME

CROSS-REFERENCE TO RELATED APPLICATION

Pursuant to 35 U.S.C. § 119 (e), this application claims priority to the filing date of U.S. Provisional Patent Application Ser. No. 63/346,722 filed May 27, 2022; the disclosure of which application is incorporated herein by reference in its entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector. The amount of light that reaches the detector can impact the overall quality of the optical signal outputted by the detector. The amount of light that reaches the detector can be raised by increasing the surface area of the detector or by increasing collection of the light from the sample.

One technique that utilizes light detection to characterize the components in a sample is flow cytometry. Using data generated from the detected light, distributions of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the present disclosure include systems for detecting light from a particle in a flow stream by spectral discrimination. Light detection systems according to certain embodiments include a wavelength separator component configured to propagate light between a first set of linear variable optical filters and a second set of linear variable optical filters where each set of linear variable optical filters is configured to pass light having predetermined sub-spectral ranges and a plurality of photodetectors positioned to detect light from each sub-spectral range across the linear variable optical filters. Systems having a light source for irradiating a particle in a flow stream and a photodetector modulator component for binning data signals generated in a plurality of photodetector channels of the light detection system are also described. Methods for detecting light with the subject systems and kits having one or more components for detecting light according to the subject methods are also provided.

In some embodiments, each set of linear variable optical filters is configured to pass light having wavelengths that range across the linear variable optical filter from 200 nm to 1200 nm, such as from 500 nm to 800 nm. For example, the first set of linear variable optical filters may be configured to pass light having wavelengths that range across the linear variable optical filters from 500 nm to 650 nm and the second set of linear variable optical filters is configured to pass light having wavelengths that range across the linear variable optical filters from 650 nm to 800 nm. In some instances, each set of linear variable optical filters includes a long pass linear variable bandpass filter and a short pass linear variable bandpass filter. In some instances, the long pass variable bandpass filter is offset from the short pass variable bandpass filter by a predetermined distance. In certain instances, sub-spectral ranges of light that can pass across each set of linear variable optical filters are determined by the offset of the long pass variable bandpass filter from the short pass linear variable bandpass filter. In certain instances, the long pass linear variable bandpass filter is offset from the short pass variable bandpass filter in each set of linear variable optical filters such that each sub-spectral range of light have a spectral width of from 1 nm to 50 nm, such as from 5 nm to 45 nm and including from 10 nm to 40 nm. In certain embodiments, the long pass linear variable bandpass filter is offset from the short pass variable bandpass filter in each set of linear variable optical filters such that each sub-spectral range of light has a spectral width of 20 nm.

In some embodiments, each spectral range of light that passes through the set of linear variable optical filters has a spectral width of from 5 nm to 50 nm, such as a spectral width from 10 nm to 40 nm, such as a spectral width of about 20 nm. In some embodiments, the first set of linear variable optical filters and the second set of linear variable optical filters are positioned along two parallel planes. In some instances, the wavelength separator component is configured to convey light back-and-forth between the first set of linear variable optical filters and the second set of linear variable optical filters. In certain instances, the wavelength separator component is configured such that the first set of linear variable optical filters are configured to pass light from low wavelengths to high wavelengths across the linear variable optical filters and the second set of linear variable optical filters are configured to pass light from high wavelengths to low wavelengths across the linear variable optical filters. For example, light from the sample may be conveyed to a first segment of the first set of linear variable optical filters and pass light having wavelengths that range from 500 nm to 520 nm and reflect the remaining portion of the light to a first segment of the second set of linear variable optical filters which is configured to pass light having wavelengths that range from 800 nm to 780 nm and reflect the remaining portion of the light a second segment of the first set of linear variable optical filters. This conveyance and passage of light back and forth between the first set of linear variable optical filters and second set of linear variable optical filters is in certain embodiments continued across the entire length of each set of linear variable optical filters.

In some embodiments, light detection systems include a plurality of photodetectors that are positioned across each set of linear optical filters. In some instances, each photodetector is configured to detect a sub-spectral range of light at each segment of the linear optical filters. In some instances, each photodetector is configured to detect a sub-spectral range of light having a spectral width of from 5 nm to nm (e.g., 20 nm) at each segment of the linear optical filters. In certain instances, the light detection system includes a first set of photodetectors positioned across the first set of linear variable optical filters, that are configured to detect light having a sub-spectral range of from 500 nm to 520 nm; 520 nm to 540 nm; 540 nm to 560 nm; 560 nm to 580 nm; 580 nm to 600 nm; 600 nm to 620 nm; and 620 nm to 640 nm; 640 nm to 660 nm; and a second set of photodetectors positioned across the second set of linear variable optical filters that are configured to detect light having a sub-spectral range of from: 800 nm to 780 nm; 780 nm to 760 nm; 760 nm to 740 nm; 740 nm to 720 nm; 720 nm to 700 nm; 700 nm to 680 nm; and 680 nm to 660 nm.

In some instances, the photodetector component of the light detection system includes a modulator component configured to bin data signals from two or more different photodetector channels. In some instances, each photodetector channel is configured to generate data signals for each sub-spectral range of light. In some instances, the modulator component is configured for binning data signals from adjacent photodetector channels, such as horizontal binning of adjacent photodetector channels. In some embodiments, the modulator component includes an output modulator configured to modulate signal output from each photodetector channel. In certain embodiments, the output modulator includes one or more of an amplifier (e.g., a transimpedance amplifier), switch circuit and a differential amplifier. In certain instances, the modulator component is configured to multiplex the generated data signals.

Aspects of the present disclosure also include systems for measuring light from a sample (e.g., in a flow stream) by spectral discrimination. In certain embodiments, systems include a light source and a light detection system configured to detect predetermined spectral ranges of light having a wavelength separator component configured to propagate light between a first set of linear variable optical filters and a second set of linear variable optical filters that are configured to pass light having predetermined sub-spectral ranges across the linear variable optical filters and a plurality of photodetectors positioned to detect light from each sub-spectral range across the linear variable optical filters. In some embodiments, systems also include an optical collection system for propagating light to the light detection system. The optical collection system may be a free-space light relay system or may include fiber optics such as a fiber optics light relay bundle. In some embodiments, the system is a flow cytometer.

Aspects of the disclosure also include methods for irradiating a sample (e.g., in a flow stream) in an interrogation field with a light source, collecting and detecting light from the sample with the subject light detection systems and measuring the detected light at one or more wavelengths. In some embodiments, light is collected and conveyed to the light detection system by a free-space light relay system. In other embodiments, light is collected and conveyed to the light detection system by fiber optics, such as a fiber optics light relay bundle.

Kits including one or more components of the subject light detection systems are also provided. Kits according to certain embodiments, include a first set of linear variable optical filters, a second set of linear variable optical filters and a photodetector. In some embodiments, one or more of the linear variable optical filters is a linear variable bandpass filter such as a long pass linear variable bandpass filter or a short pass linear variable bandpass filter. In some instances, kits include an optical collection component, such as a fiber optics light relay bundle or a free-space light relay system. Kits may also include one or more photodetectors, such as photomultiplier tubes (e.g., metal package photomultiplier tubes) or photodiodes (e.g., avalanche photodiodes, APDs).

BRIEF DESCRIPTION OF THE FIGURES

The invention may be best understood from the following detailed description when read in conjunction with the accompanying drawings. Included in the drawings are the following figures:

FIG. 3 depicts a light detection system having a first set of linear variable optical filters and a second set of linear variable optical filters configured to convey light in a back-and-forth manner according to certain embodiments.

FIG. 7 depicts a block diagram of a computing system according to certain embodiments.

DETAILED DESCRIPTION

Figure 1:
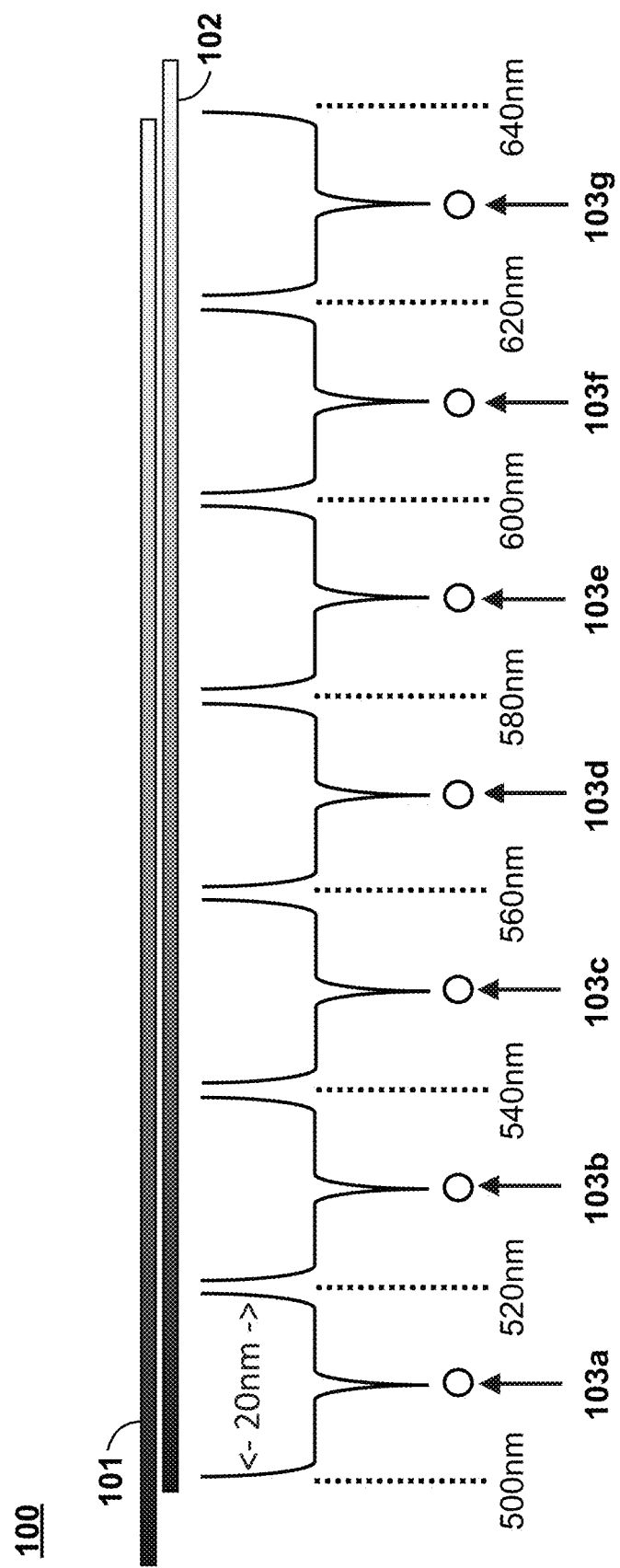
FIG. 1 depicts a first set of linear variable optical filters and photodetectors for detecting light across a plurality of segments according to certain embodiments.

Aspects of the present disclosure include systems for detecting light from a particle in a flow stream by spectral discrimination. Light detection systems according to certain embodiments include a wavelength separator component configured to propagate light between a first set of linear variable optical filters and a second set of linear variable optical filters where each set of linear variable optical filters is configured to pass light having predetermined sub-spectral ranges and a plurality of photodetectors positioned to detect light from each sub-spectral range across the linear variable optical filters. Systems having a light source for irradiating a particle in a flow stream and a photodetector modulator component for binning data signals generated in a plurality of photodetector channels of the light detection system are also described. Methods for detecting light with the subject systems and kits having one or more components for detecting light according to the subject methods are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides systems and methods for detecting light from particles in a flow stream (e.g., in a particle analyzer) by spectral discrimination. In further describing embodiments of the disclosure, light detection systems having a first set of linear variable optical filters and a second set of linear variable optical filters and a plurality of photodetectors configured to detect light from sub-spectral ranges across the linear variable optical filters are first described in greater detail. Next, methods for detecting light by spectral discrimination with the subject systems are described. Kits having one or more components of the subject spectral discrimination detecting systems are described.

Systems for Detecting Light from Particles in a Flow Stream by Spectral Discrimination Aspects of the present disclosure include systems for detecting light from a particle in a flow stream by spectral discrimination. The term "spectral discrimination" is used herein in its conventional sense to refer to the differential detection of a spectrum of wavelengths of light from an irradiated particle, where in certain instances the differential detection of the spectrum of light from an irradiated particle may be used to identify or characterize the particle or component thereof. As described in greater detail below, the subject systems are configured to detect a plurality of different wavelengths of light emanating from an irradiated particle, where in some instances one or more data signals is generated in response to each different detected wavelength of light. In some embodiments, the subject systems provide for the detection of an entire spectrum of wavelengths of light from an irradiated particle.

In some embodiments, systems for detecting light from a particle by spectral discrimination as described herein provides for increased precision in capturing targeted spectral emission bands by a photodetector array, such as where narrow spectrum sampling precision is increased by 5% or more as compared to signal processing without binning data signals from two or more photodetector channels, such as 10% or more, such as 15% or more, such as 25% or more, such as 50% or more, such as 75% or more, such as 90% or more and including by 95% or more. According to certain embodiments, light detection systems described herein are capable of generating 10 or more distinct spectral ranges of light while exhibiting a light loss of 20% or less, such as 19% or less, such as 18% or less, such as 17% or less, such as 16% or less, such as 15% or less and including generating 10 or more distinct spectral ranges of light while exhibiting a light loss of 10% or less.

In some embodiments, the subject light detection systems provide for increased resolution of narrow spectral ranges of light. For example, the light detection systems can provide for greater granularity in spectrally separating light from an irradiated particle. In some embodiments, light detection systems provide for increased signal-to-noise ratio of data signals by 5% or more, such as 10% or more, such as 15% or more, such as 25% or more, such as 50% or more, such as 75% or more, such as 90% or more and including by 95% or more. Generating data signals in a plurality of photodetector channels according to certain embodiments of the present light detection systems increases the signal-to-noise ratio by allowing for the processing of data signals from a greater number of photodetector channels simultaneously. Since a greater number of data signals can be processed for a predetermined spectral width, there is an increased signal-to-noise ratio for light detected from the sample. In addition, light detection systems can in some instances increase the signal-to-noise ratio by reducing the amount of interference between the emission of the different fluorophores in the sample.

Light detection systems according to certain embodiments include a wavelength separator component configured to propagate light between a first set of linear variable optical filters and a second set of linear variable optical filters where each set of linear variable optical filters is configured to pass light having predetermined sub-spectral ranges. The term "wavelength separator" is used herein in its conventional sense to refer to an optical component that is configured to separate light (e.g., collected from a particle irradiated in a flow stream) into predetermined sub-spectral ranges. In some embodiments, the wavelength separator is configured to separate collected light into predetermined spectral ranges by passing light having a predetermined spectral range and reflecting one or more remaining spectral ranges of light. In other embodiments, the wavelength separator is configured to separate collected light into predetermined spectral ranges by passing light having a predetermined spectral range and absorbing one or more remaining spectral ranges of light. In yet other embodiments, the wavelength separator is configured to spatially diffract collected light into predetermined spectral ranges.

In some instances, light detected with the subject systems is emitted light such as fluorescence from an irradiated particle. In some instances, light from the irradiated particle is scattered light. In some cases, the scattered light is forward scattered light. In some cases, the scattered light is backscattered light. In some cases, the scattered light is side scattered light. In some instances light from the irradiated particle is transmitted light.

In embodiments, each set of linear variable optical filters of the wavelength separator component is configured to pass light having wavelengths that range across the linear variable optical filters from 200 nm to 1200 nm, such as from 250 nm to 1150 nm, such as from 300 nm to 1100 nm, such as from 350 nm to 1050 nm, such as from 400 nm to 1000 nm, such as from 450 nm to 950 nm, such as from 500 nm to 900 nm, such as from 550 nm to 850 nm and including from 600 nm to 800 nm. In some embodiments, each set of linear variable optical filters includes a long pass variable bandpass filter and a short pass variable bandpass filter. In certain embodiments, the long pass linear variable bandpass filter is a linear variable bandpass filter which passes wavelengths of light across the bandpass filter that are greater than 400 nm, greater than 450 nm, greater than 500 nm, greater than 550 nm, greater than 600 nm, greater than 650 nm, greater than 700 nm, greater than 750 nm, greater than 800 nm. In certain embodiments, the short pass linear variable bandpass filter is a linear variable linear variable bandpass filter which passes wavelengths of light across the bandpass filter that are 600 nm or less, 550 nm or less, 500 nm or less, 450 nm or less, 400 nm or less, 350 nm or less, 300 nm or less, 250 nm or less, 200 nm or less.

Each set of linear variable optical filters includes two linear variable optical filters arranged spaced apart and adjacent to each other. The distance between the two linear variable optical filters in each set of linear variable optical filters may vary, such as from 0.001 mm to 25 mm, such as from 0.005 mm to 20 mm, such as from 0.01 mm to 15 mm, such as from 0.05 mm to 10 mm, such as from 0.5 mm to 10 mm, such as from 1 mm to 9 mm and including from 2 mm to 8 mm. In certain instances, the two linear variable optical filters in each set of linear variable optical filters are in physical contact with each other (i.e., there is no space between the two linear variable optical filters).

In some instances, the long pass variable bandpass filter is positioned offset from the short pass variable bandpass filter by a predetermined distance. In certain instances, sub-spectral ranges of light that can pass across each set of linear variable optical filters are determined by the offset of the long pass variable bandpass filter from the short pass linear variable bandpass filter. In some embodiments, the long pass variable bandpass filter is positioned offset from the short pass variable bandpass filter by 0.0001 mm or more, such as by 0.0005 mm or more, such as by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 1.5 mm or more, such as by 2 mm or more, such as by 2.5 mm or more, such as by 3 mm or more, such as by 3.5 mm or more, such as by 4 mm or more, such as b 4.5 mm or more, such as by 5 mm or more, such as by 6 mm or more, such as by 7 mm or more, such as by 8 mm or more, such as by 9 mm or more, such as by 10 mm or more and including by 15 mm or more. In certain embodiments, the long pass variable bandpass filter is positioned offset from the short pass variable bandpass filter in each set of linear variable optical filters in the wavelength separator component by a distance of from 0.001 mm to 25 mm, such as from 0.005 mm to 20 mm, such as from 0.01 mm to 15 mm, such as from 0.05 mm to 10 mm, such as from 0.1 mm to 10 mm, such as from 0.5 mm to mm, such as from 1 mm to 9 mm and including from 2 mm to 8 mm.

In some embodiments, each set of linear variable optical filters is configured to generate a plurality of spectral ranges of light that pass across linear variable optical filters and to a photodetector (as described in greater detail below), such as 3 or more spectral ranges that are each detected by a photodetector, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more spectral ranges of light that are each detected by a photodetector. In some embodiments, each spectral range of light that passes through the set of linear optical filters and is detected by a photodetector has a spectral width of from 5 nm to 50 nm, such as a spectral width from 10 nm to 40 nm, such as a spectral width of about 20 nm. In certain instances, the long pass linear variable bandpass filter is offset from the short pass variable bandpass filter in each set of linear variable optical filters such that each sub-spectral range of light have a spectral width of 1 nm or more, such as 2 nm or more, such as 3 nm or more, such as 4 nm or more, such as 5 nm or more, such as 6 nm or more, such as 7 nm or more, such as 8 nm or more, such as 9 nm or more, such as 10 nm or more, such as 11 nm or more, such as 12 nm or more, such as 13 nm or more, such as 14 nm or more, such as 15 nm or more, such as 16 nm or more, such as 17 nm or more, such as 18 nm or more, such as 19 nm or more, such as 20 nm or more, such as 25 nm or more, such as 30 nm or more, such as nm or more, such as 40 nm or more, such as 45 nm or more and including 50 nm or more. In certain embodiments, the long pass linear variable bandpass filter is offset from the short pass variable bandpass filter in each set of linear variable optical filters such that each sub-spectral range of light have a spectral width of from 1 nm to 50 nm, such as from 2 nm to 49 nm, such as from 3 nm to 48 nm, such as from 4 nm to 47 nm, such as from 5 nm to 46 nm, such as from 6 nm to 45 nm, such as from 7 nm to 44 nm, such as from 8 nm to 43 nm, such as from 9 nm to 42 nm and including from 10 nm to 40 nm. In certain embodiments, the long pass linear variable bandpass filter is offset from the short pass variable bandpass filter in each set of linear variable optical filters such that each sub-spectral range of light has a spectral width of 20 nm.

In embodiments, the first set of linear variable optical filters and the second set of linear variable optical filters are in optical communication with each other, so that light is conveyed between each other. In some instances, the wavelength separator component is configured to convey light back-and-forth between the first set of linear variable optical filters and the second set of linear variable optical filters. In some embodiments, the first set of linear variable optical filters and the second set of linear variable optical filters are positioned along two parallel planes. In other embodiments, the sets of linear variable optical filters are oriented with respect to each other in the light detection system at an angle ranging from 0.001° to 15°, such as from 0.005° to 14.5°, such as from 0.01° to 14°, such as from 0.05° to 13.5°, such as from 0.1° to 13°, such as from 0.5° to 12.5° and including from 1° to 10°.

In some embodiments, the wavelength separator component is configured such that the first set of linear variable optical filters are configured to pass light from low wavelengths to high wavelengths across the linear variable optical filters and the second set of linear variable optical filters are configured to pass light from high wavelengths to low wavelengths across the linear variable optical filters. In some instances, light from the sample is conveyed to a first segment of the first set of linear variable optical filters and pass light having wavelengths that range from 500 nm to 520 nm and reflect the remaining portion of the light to a first segment of the second set of linear variable optical filters which is configured to pass light having wavelengths that range from 800 nm to 780 nm and reflect the remaining portion of the light a second segment of the first set of linear variable optical filters. This conveyance and passage of light back and forth between the first set of linear variable optical filters and second set of linear variable optical filters is in certain embodiments continued across a length of each set of linear variable optical filters, such as 10% or more of the length of each set of linear variable optical filters, such as 15% or more, such as 20% or more, such as 25% or more, such as 50% or more, such as 75% or more, such as 90% or more, such as 95% or more, such as 97% or more, such as 99% or more and including 99.5% or more of the length of each set of linear variable optical filters. In certain instances, light is conveyed back-and-forth between first set of linear variable optical filters and second set of linear variable optical filters across the entire length of the linear variable optical filters.

Light passed through the set of linear variable optical filters is detected by a plurality of photodetectors. Each photodetector is configured to detect a predetermined spectral width of light that is passed through the set of linear variable optical filters. For example, each photodetector may be positioned along the length of the set of linear variable optical filters to detect a spectral width of 5 nm to 50 nm, such as a spectral width from 10 nm to 40 nm, such as a spectral width of about 20 nm. In certain instances, each photodetector is positioned to detect light passing through a segment of the set of linear variable optical filters having a spectral width of 1 nm or more, such as 2 nm or more, such as 3 nm or more, such as 4 nm or more, such as 5 nm or more, such as 6 nm or more, such as 7 nm or more, such as 8 nm or more, such as 9 nm or more, such as 10 nm or more, such as 11 nm or more, such as 12 nm or more, such as 13 nm or more, such as 14 nm or more, such as 15 nm or more, such as 16 nm or more, such as 17 nm or more, such as 18 nm or more, such as 19 nm or more, such as 20 nm or more, such as 25 nm or more, such as 30 nm or more, such as 35 nm or more, such as 40 nm or more, such as 45 nm or more and including 50 nm or more. In certain embodiments, light detection systems include a photodetector positioned to detect light passing through the set of linear variable optical filters having a spectral width of 20 nm.

In some embodiments, the first set of linear variable optical filters is configured to pass light that range from 500 nm to 650 nm, such as where a photodetector is positioned to detect light passed through the first set of linear variable optical filters at intervals having spectral widths of 20 nm. FIG. 1A depicts a first set of linear variable optical filters and photodetectors for detecting light across a plurality of segments according to certain embodiments. As shown in FIG. 1A, linear variable optical filter set 100 includes a first linear variable optical filter 101 (e.g., a short pass linear variable bandpass filter) and a second linear variable optical filter 102 (e.g., a long pass linear variable bandpass filter). Light passes across linear variable optical filter set 100 to photodetectors 103*a*, 103*b*, 103*c*, 103*d*, 103*e*, 103*f* and 103*g* where each photodetector is configured to detect a spectral width of light of 20 nm. Photodetector 103*a* is configured to detect light from 500 nm to 520 nm, photodetector 103*b* is configured to detect light from 520 nm to 540 nm, photodetector 103*c* is configured to detect light from 540 nm to 560 nm, photodetector 103*d* is configured to detect light from 560 nm to 580 nm, photodetector 103*e* is configured to detect light from 580 nm to 600 nm, photodetector 103*f* is configured to detect light from 600 nm to 620 nm and photodetector 103*g* is configured to detect light from 620 nm to 640 nm.

Figure 2:
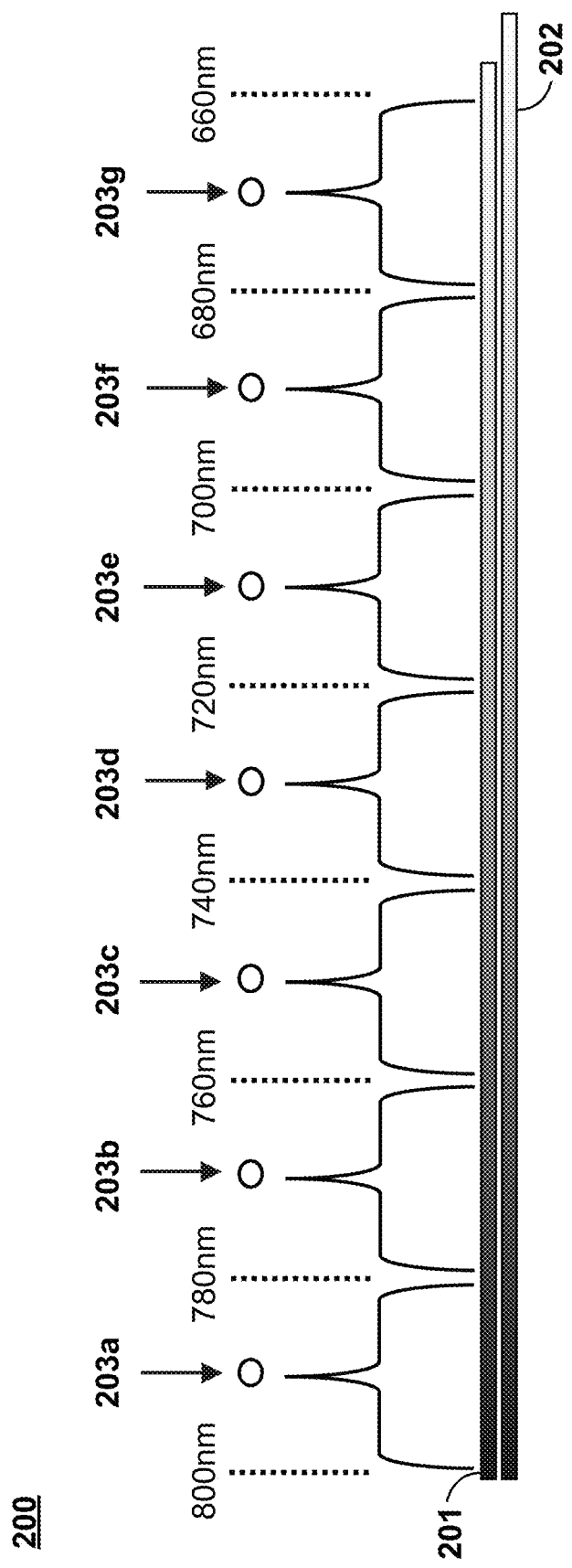
FIG. 2 depicts a second set of linear variable optical filters and photodetectors for detecting light across a plurality of segments according to certain embodiments.

In some embodiments, the second set of linear variable optical filters is configured to pass light that ranges from 650 nm to 800 nm, such as where a photodetector is positioned to detect light passed through the second set of linear variable optical filters at intervals having spectral widths of 20 nm. FIG. 2A depicts a first set of linear variable optical filters and photodetectors for detecting light across a plurality of segments according to certain embodiments. As shown in FIG. 2A, linear variable optical filter set 200 includes a first linear variable optical filter 201 (e.g., a short pass linear variable bandpass filter) and a second linear variable optical filter 202 (e.g., a long pass linear variable bandpass filter). Light passes across linear variable optical filter set 200 to photodetectors 203*a*, 203*b*, 203*c*, 203*d*, 203*e*, 203*f* and 203*g* where each photodetector is configured to detect a spectral width of light of 20 nm. Photodetector 203*a* is configured to detect light from 800 nm to 780 nm, photodetector 203*b* is configured to detect light from 780 nm to 760 nm, photodetector 203*c* is configured to detect light from 760 nm to 740 nm, photodetector 203*d* is configured to detect light from 740 nm to 720 nm, photodetector 203*e* is configured to detect light from 720 nm to 700 nm, photodetector 203*f* is configured to detect light from 700 nm to 680 nm and photodetector 203*g* is configured to detect light from 680 nm to 660 nm.

In embodiments, the first set of linear variable optical filters and second set of linear variable optical filters are configured to convey light between each other. In some instances, each set of linear variable optical filters is configured to pass a spectral range of light and to convey (e.g., by reflection) one or more remaining spectral ranges of light to the other set of linear variable optical filters. Light is conveyed back-and-forth between first set of linear variable optical filters and second set of linear variable optical filters across the length of the linear variable optical filters. In one example, the set of linear variable optical filters is configured to receive light from the sample and to pass a first spectral range of light and convey a second spectral range of light to the second set of linear variable optical filters. The second set of linear variable optical filters is configured to pass a third spectral range of light and to convey a fourth spectral range of light back to the first set of linear variable optical filters. The first set of linear variable optical filters is configured to then pass a fifth spectral range of light back to the second set of linear variable optical filters. This back-and-forth conveyance and passage of light continues across the sets of linear variable optical filters and each spectral width of light is detected by the plurality of photodetectors.

FIG. 3 depicts a light detection system having a first set of linear variable optical filters and a second set of linear variable optical filters configured to convey light in a back-and-forth manner according to certain embodiments. Light is propagated to the light detection system with an optical collection component 305, such as fiber optics or free-space light relay system. Light from optical collection component 305 is conveyed to a first set of linear variable optical filters 301 which is composed of a short pass linear variable bandpass filter and a long pass linear variable bandpass filter. Light having wavelengths from 500 nm to 520 nm is passed across the first segment of the first set of linear variable optical filters 301 and detected with photodetector 303a. The remaining wavelengths of light (i.e., light having wavelengths greater than 520 nm) is reflected and conveyed to a second set of linear variable optical filters 302. The second set of linear variable optical filters 302 is composed of a short pass linear variable bandpass filter and a long pass linear variable bandpass filter. Light having wavelengths from 800 nm to 780 nm is passed across the first segment of the second set of linear variable optical filters 302 and detected with photodetector 303h. The remaining wavelengths of light are reflected back to the first set of linear variable optical filters 301, where light having wavelengths from 520 nm to 540 nm is passed across the second segment of the first set of linear variable optical filters 301 and detected with photodetector 303b. Light is reflected back-and-forth between the first set of linear variable optical filters 301 and the second set of linear variable optical filters 302 and light detected by photodetectors 303b, 303c, 303d, 303e, 303f and 303g after passing through segments across the first set of linear variable optical filters 301 and detected by photodetectors 303i, 303j, 303k, 303l, 303m and 303n after passing through segments across the second set of linear variable optical filters 302.

In embodiments, light detection systems include a plurality of photodetectors positioned to detect light from each sub-spectral range across the linear variable optical filters. In some embodiments, light is conveyed to each photodetector through an optical adjustment component. The term "optical adjustment" is used herein in its conventional sense to refer to any device that is capable of changing the spatial width of light or some other characteristic of the light passed through each segment of the linear variable optical filters, such as for example, direction, wavelength, beam width, beam intensity and focal spot. Optical adjustment protocols may be any convenient device which adjusts one or more characteristics of the light, including but not limited to lenses, mirrors, filters, fiber optics, wavelength separators, pinholes, slits, collimating protocols and combinations thereof. In certain embodiments, systems of interest include one or more focusing lenses. The focusing lens, in one example may be a de-magnifying lens. In another example, the focusing lens is a magnifying lens. In other embodiments, systems of interest include one or more mirrors. In still other embodiments, systems of interest include fiber optics.

In some embodiments, the optical adjustment component is in physical contact with the photodetector. In other embodiments, the optical adjustment component is in optical communication with the active surface of the photodetector and may be positioned 0.001 mm or more from the photodetector, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the photodetector.

Photodetectors may be releasably connected to each optical adjustment component in the subject light detection modules. Photodetectors and optical adjustment components may be connected by any convenient protocol. In certain embodiments, the photodetectors and optical components are connected together by co-mounting the photodetector with the optical component or with a fastener, such as a hook and loop fasteners, magnets, latches, notches, countersinks, counter-bores, grooves, pins, tethers, hinges, Velcro, non-permanent adhesives or a combination thereof. In certain instances, a photodetector is connected to an optical component by slot-fitting the wavelength separator into a groove of the light detection module. In yet other instances, a photodetector is connected to an optical component by one or more screws.

In embodiments, each light detection systems includes two or more photodetectors, such as 3 or more, such as 4 or more, such as 5 or more, such as 6 or more, such as 7 or more, such as 8 or more, such as 9 or more, such as or more, such as 15 or more, such as 25 or more, such as 50 or more and including 100 or more photodetectors. In some embodiments, light detection modules include one or more photodetector arrays. The term "photodetector array" is used in its conventional sense to refer to an arrangement or series of two or more photodetectors. In embodiments, photodetector arrays may include 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors, such as 10 or more photodetectors, such as 12 or more photodetectors and including 15 or more photodetectors.

In some embodiments, each sub-spectral range of light conveyed through the linear variable optical filters is propagated to one or more photodetectors, such as where each sub-spectral range of light is conveyed to a single photodetector, to 2 different photodetectors, to 3 different photodetectors, to 4 different photodetectors and including where each sub-spectral range of light is conveyed to 5 or more different photodetectors. In certain instances, each sub-spectral range of light is conveyed to its own distinct detector (i.e., a distinct photodetector configured to detect light from each different sub-spectral range). In these embodiments, light from each sub-spectral range may be collected and propagated to the photodetector through a distinct set of optical adjustment components, such as through a distinct set of collimators and focusing lenses for each different sub-spectral range and photodetector.

In certain instances, each sub-spectral range of light conveyed through the linear variable optical filters is detected in one or more different detector channels (e.g., in a multi-channel photodetector array). In some instances, each sub-spectral range of light is detected in distinct detector channels. In other instances, each sub-spectral range of light is detected across a plurality of detector channels, such as 2 or more detector channels, such as 3 or more, such as 4 or more, such as 8 or more, such as 16 or more and including where each sub-spectral range of light conveyed though the linear variable optical filters is detected in 32 or more detector channels.

Photodetectors of the subject light detection systems may be any convenient light detecting protocol, including but not limited to photosensors or photodetectors, such as avalanche photodiodes (APDs), active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from $0.01$ cm$^2$ to $10$ cm$^2$, such as from $0.05$ cm$^2$ to $9$ cm$^2$, such as from, such as from $0.1$ cm$^2$ to $8$ cm$^2$, such as from $0.5$ cm$^2$ to $7$ cm$^2$ and including from $1$ cm$^2$ to $5$ cm$^2$.

In embodiments of the present disclosure, each photodetector may be configured to detect light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light at 400 or more different wavelengths.

Photodetectors may be configured to measure light continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

The photodetectors may be configured to take measurements of the light one or more times during each discrete time interval, such as 2 or more times, such as 3 or more times, such as 5 or more times and including 10 or more times. In certain embodiments, light is measured by the photodetector 2 or more times, with the data in certain instances being averaged. Light from the particle in the flow stream may be detected in one or more photodetector channels, such as 2 or more, such as 3 or more, such as 4 or more, such as 5 or more, such as 6 or more, such as 7 or more, such as 8 or more, such as 9 or more and including 10 or more photodetector channels.

In some instances, light detected from particles in the sample is scattered light. In some cases, the scattered light is forward scattered light. In some cases, the scattered light is backscattered light. In some cases, the scattered light is side scattered light. In some instances, light conveyed from the irradiated particle is transmitted light. In certain embodiments, light detected from each particle is emitted light, such as particle luminescence (i.e., fluorescence or phosphorescence). In these embodiments, each particle may include one or more fluorophores which emits fluorescence in response to irradiation by the two or more light sources. For example, each particle may include 2 or more fluorophores, such as 3 or more, such as 4 or more, such as 5 or more, such as 6 or more, such as 7 or more, such as 8 or more, such as 9 or more and including 10 or more fluorophores. In some instances, each particle includes a fluorophore which emits fluorescence in response to irradiation by the light source. In some embodiments, fluorophores of interest may include but are not limited to dyes suitable for use in analytical applications (e.g., flow cytometry, imaging, etc.), such as an acridine dye, anthraquinone dyes, arylmethane dyes, diarylmethane dyes (e.g., diphenyl methane dyes), chlorophyll containing dyes, triarylmethane dyes (e.g., triphenylmethane dyes), azo dyes, diazonium dyes, nitro dyes, nitroso dyes, phthalocyanine dyes, cyanine dyes, asymmetric cyanine dyes, quinon-imine dyes, azine dyes, eurhodin dyes, safranin dyes, indamins, indophenol dyes, fluorine dyes, oxazine dye, oxazone dyes, thiazine dyes, thiazole dyes, xanthene dyes, fluorene dyes, pyronin dyes, fluorine dyes, rhodamine dyes, phenanthridine dyes, as well as dyes combining two or more of the aforementioned dyes (e.g., in tandem), polymeric dyes having one or more monomeric dye units and mixtures of two or more of the aforementioned dyes thereof. A large number of dyes are commercially available from a variety of sources, such as, for example, Molecular Probes (Eugene, OR), Dyomics GmbH (Jena, Germany), Sigma-Aldrich (St. Louis, MO), Sirigen, Inc. (Santa Barbara, CA), Becton Dickinson (BD) and Company (Franklin Lakes, NJ) and Exciton (Dayton, OH). For example, the fluorophore may include 4-acetamido-4'-isothiocyanatostilbene-2,2'disulfonic acid; acridine and derivatives such as acridine, acridine orange, acridine yellow, acridine red, and acridine isothiocyanate; allophycocyanin (APC), phycoerythrin (PE), peridinin-chlorophyll protein, 5-(2'-aminoethyl)aminonaphthalene-1-sulfonic acid (EDANS); 4-amino-N-[3-vinylsulfonyl)phenyl]naphthalimide-3,5 disulfonate (Lucifer Yellow VS); N-(4-anilino-1-naphthyl)maleimide; anthranilamide; Brilliant Yellow; coumarin and derivatives such as coumarin, 7-amino-4-methylcoumarin (AMC, Coumarin 120), 7-amino-4-trifluoromethylcouluarin (Coumaran 151); cyanine and derivatives such as cyanosine, Cy3, Cy3.5, Cy5, Cy5.5, and Cy7; 4',6-diaminidino-2-phenylindole (DAPI); 5', 5"-dibromopyrogallol-sulfonephthalein (Bromopyrogallol Red); 7-diethylamino-3-(4'-isothiocyanatophenyl)-4-methylcoumarin; diethylaminocoumarin; diethylenetriamine pentaacetate; 4,4'-diisothiocyanatodihydro-stilbene-2,2'-disulfonic acid; 4,4'-diisothiocyanatostilbene-2,2'-disulfonic acid; 5-[dimethylamino]naphthalene-1-sulfonyl chloride (DNS, dansyl chloride); 4-(4'-dimethylaminophenylazo)benzoic acid (DABCYL); 4-dimethylaminophenylazophenyl-4'-isothiocyanate (DABITC); eosin and derivatives such as eosin and eosin isothiocyanate; erythrosin and derivatives such as erythrosin B and erythrosin isothiocyanate; ethidium; fluorescein and derivatives such as 5-carboxyfluorescein (FAM), 5-(4,6-dichlorotriazin-2-yl)aminofluorescein (DTAF), 2'7'-dimethoxy-4'5'-dichloro-6-carboxyfluorescein (JOE), fluorescein isothiocyanate (FITC), fluorescein chlorotriazinyl, naphthofluorescein, and QFITC (XRITC); fluorescamine; IR144; IR1446; Green Fluorescent Protein (GFP); Reef Coral Fluorescent Protein (RCFP); Lissamine™; Lissamine rhodamine, Lucifer yellow; Malachite Green isothiocyanate; 4-methylumbelliferone; ortho cresolphthalein; nitrotyrosine; pararosaniline; Nile Red; Oregon Green; Phenol Red; B-phycoerythrin; o-phthaldialdehyde; pyrene and derivatives such as pyrene, pyrene butyrate and succinimidyl 1-pyrene butyrate; Reactive Red 4 (Cibacron™ Brilliant Red 3B-A); rhodamine and derivatives such as 6-carboxy- X-rhodamine (ROX), 6-carboxyrhodamine (R6G), 4,7-dichlororhodamine lissamine, rhodamine B sulfonyl chloride, rhodamine (Rhod), rhodamine B, rhodamine 123, rhodamine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, and tetramethyl rhodamine isothiocyanate (TRITC); riboflavin; rosolic acid and terbium chelate derivatives; xanthene; dye-conjugated polymers (i.e., polymer-attached dyes) such as fluorescein isothiocyanate-dextran as well as dyes combining two or more dyes (e.g., tandem dyes or protein complex tandem dyes) such as phycoerythrin (PE) tandem dyes or allophycocyanin (APC) tandem dyes, for example phycoerythrin-CF594 (PE-CF594) tandem, phycoerythrin-cyanine 5 tandem (PE-Cy5), phycoerythrin-cyanine 5.5 tandem (PE-Cy5.5), phycoerythrin-cyanine 7 tandem (PE-Cy7), allophycocyanin-R700 tandem (APC-R700), allophycocyanin-cyanine 7 (APC-Cy7), polymeric dyes having one or more monomeric dye units and mixtures of two or more of the aforementioned dyes or combinations thereof.

In some instances, the fluorophore is polymeric dye. In some instances of the method, the polymeric dye includes a conjugated polymer. Conjugated polymers (CPs) are characterized by a delocalized electronic structure which includes a backbone of alternating unsaturated bonds (e.g., double and/or triple bonds) and saturated (e.g., single bonds) bonds, where π-electrons can move from one bond to the other. As such, the conjugated backbone may impart an extended linear structure on the polymeric dye, with limited bond angles between repeat units of the polymer. For example, proteins and nucleic acids, although also polymeric, in some cases do not form extended-rod structures but rather fold into higher-order three-dimensional shapes. In addition, CPs may form "rigid-rod" polymer backbones and experience a limited twist (e.g., torsion) angle between monomer repeat units along the polymer backbone chain. In some instances, the polymeric dye includes a CP that has a rigid rod structure. The structural characteristics of the polymeric dyes can have an effect on the fluorescence properties of the molecules.

Polymeric dyes of interest include, but are not limited to, those dyes described by Gaylord et al. in U.S. Publication Nos. 20040142344, 20080293164, 20080064042, 20100136702, 20110256549, 20110257374, 20120028828, 20120252986, 20130190193, 20160264737, 20160266131, 20180231530, 20180009990, 20180009989, and 20180163054, the disclosures of which are herein incorporated by reference in their entirety; and Gaylord et al., J. Am. Chem. Soc., 2001, 123 (26), pp 6417-6418; Feng et al., Chem. Soc. Rev., 2010,39, 2411-2419; and Traina et al., J. Am. Chem. Soc., 2011, 133 (32), pp 12600-12607, the disclosures of which are herein incorporated by reference in their entirety.

The polymeric dye may have one or more desirable spectroscopic properties, such as a particular absorption maximum wavelength, a particular emission maximum wavelength, extinction coefficient, quantum yield, and the like (see e.g., Chattopadhyay et al., "Brilliant violet fluorophores: A new class of ultrabright fluorescent compounds for immunofluorescence experiments." Cytometry Part A, 81A (6), 456-466, 2012). In some embodiments, the polymeric dye has an absorption curve between 280 nm and 475 nm. In certain embodiments, the polymeric dye has an absorption maximum (excitation maximum) in the range 280 nm and 475 nm. In some embodiments, the polymeric dye absorbs incident light having a wavelength in the range between 280 nm and 475 nm. In some embodiments, the polymeric dye has an emission maximum wavelength ranging from 400 nm to 850 nm, such as 415 nm to 800 nm, where specific examples of emission maxima of interest include, but are not limited to: 421 nm, 510 nm, 570 nm, 602 nm, 650 nm, 711 nm and 786 nm. In some instances, the polymeric dye has an emission maximum wavelength in a range selected from the group consisting of 410 nm to 430 nm, 500 nm to 520 nm, 560 nm to 580 nm, 590 nm to 610 nm, 640 nm to 660 nm, 700 nm to 720 nm, and 775 nm to 795 nm. In certain embodiments, the polymeric dye has an emission maximum wavelength of 421 nm. In some instances, the polymeric dye has an emission maximum wavelength of 510 nm. In some cases, the polymeric dye has an emission maximum wavelength of 570 nm. In certain embodiments, the polymeric dye has an emission maximum wavelength of 602 nm. In some instances, the polymeric dye has an emission maximum wavelength of 650 nm. In certain cases, the polymeric dye has an emission maximum wavelength of 711 nm. In some embodiments, the polymeric dye has an emission maximum wavelength of 786 nm. In certain instances, the polymeric dye has an emission maximum wavelength of 421 nm±5 nm. In some embodiments, the polymeric dye has an emission maximum wavelength of 510 nm±5 nm. In certain instances, the polymeric dye has an emission maximum wavelength of 570 nm±5 nm. In some instances, the polymeric dye has an emission maximum wavelength of 602 nm±5 nm. In some embodiments, the polymeric dye has an emission maximum wavelength of 650 nm±5 nm. In certain instances, the polymeric dye has an emission maximum wavelength of 711 nm±5 nm. In some cases, the polymeric dye has an emission maximum wavelength of 786 nm±5 nm. In certain embodiments, the polymeric dye has an emission maximum selected from the group consisting of 421 nm, 510 nm, 570 nm, 602 nm, 650 nm, 711 nm and 786 nm.

Specific polymeric dyes that may be employed include, but are not limited to, BD Horizon Brilliant™ Dyes, such as BD Horizon Brilliant™ Violet Dyes (e.g., BV421, BV480, BV510, BV570, BV605, BV650, BV711, BV786, BV829); BD Horizon Brilliant™ Ultraviolet Dyes (e.g., BUV395, BUV496, BUV563, BUV615, BUV661, BUV737, BUV805); and BD Horizon Brilliant™ Blue Dyes (e.g., BB515, BB630, BB660, BB700, BB755, BB790) (BD Biosciences, San Jose, CA).

In some embodiments, the light detection system includes a modulator component that bins data signal from different photodetector channels. In some embodiments, the modulator is configured to bin data signals from two or more different photodetector channels to generate a combined spectral data signal. In some instances, the modulator component bins data signals from non-adjacent photodetectors. In some instances, the modulator component bins data signals from adjacent photodetectors. In certain instances, the modulator component is configured for horizontal binning of data signals from adjacent photodetectors.

In some embodiments, the modulator component is configured to bin data signals from three or more different photodetector channels, such as 4 or more, such as 5 or more, such as 6 or more, such as 16 or more, such as 32 or more and including from 64 or more different photodetector channels. In certain instances, each photodetector channel is configured to generate data signals for each sub-spectral range of light. In some embodiments, the binned data signals are wavelength separated data signals. In some embodiments, the binned data signals are time separated data signals. In some embodiments, the binned data signals are time and wavelength separated data signals.

In certain embodiments, the modulator component is configured to dynamically bin data signals from two or more different photodetector channels in real time. In certain instances, the modulator component includes an integrated circuit. In embodiments, the integrated circuit device may be a field programmable gated array (FPGA), an application specific integrated circuit (ASIC) or a complex programmable logic device (CPLD), or some other integrated circuit device. For example, the integrated circuit may be a field programmable gate array (FPGA), such as where the FPGA includes programming to dynamically bin the data signals from different photodetector channels. In certain instances, the modulator component is programmed with a mapped binning configuration for each photodetector channel, for example where the modulator component includes an FPGA having programming for dynamically mapping a binning configuration in real-time.

In some embodiments, the modulator component includes one or more amplifiers. In some embodiments, the amplifier component includes a plurality of amplifiers, such as transimpedance amplifiers, summing amplifiers, differential amplifiers or a combination thereof. In some instances, the modulator component includes an amplifier for each photodetector channel, such as where the modulator component includes 2 or more amplifiers, such as 4 or more, such as 8 or more, such as 12 or more, such as 16 or more, such as 20 or more, such as 24 or more, such as 28 or more, such as 32 or more, such as 36 or more, such as 40 or more, such as 44 or more, such as 48 or more, such as 52 or more, such as 56 or more, such as 60 or more and including 64 or more amplifiers.

In some embodiments, the modulator component includes a first amplifier component which is configured to amplify data signals from each photodetector channel and a second amplifier component configured to amplify data signals from the electronic switch component. In some instances, the first amplifier component includes a plurality of transimpedance amplifiers and the second amplifier component includes a plurality of differential amplifiers.

In some instances, the modulator component includes an electronic switch (e.g., a digital switch circuit) configured to bin data signals from two or more different photodetector channels. In certain instances, the switch is configured to multiplex or de-multiplex the output data signals from each photodetector channel. Depending on the number of photodetector channels and amplifiers (as described above) employed in the light detection system, the electronic switch component may include 2 or more electronic switches, such as 3 or more electronic switches, such as 4 or more electronic switches, such as 5 or more electronic switches, such as 6 or more electronic switches, such as 7 or more electronic switches, such as 8 or more electronic switches, such as 9 or more electronic switches, such as 10 or more electronic switches, such as 15 or more electronic switches, such as 25 or more electronic switches, such as 50 or more electronic switches, such as 100 or more electronic switches, such as 250 or more electronic switches, such as 500 or more electronic switches, such as 750 or more electronic switches and including 1000 or more electronic switches.

In some embodiments, light detection systems of interest include a photodetector array having N photodetector channels and an amplifier component having N transimpedance amplifiers, where N is an integer from 4 to 1000. In certain instances, the light detection system includes a photodetector array having N photodetector channels and a modulator component with N transimpedance amplifiers and an electronic switch component having an array of N×N switches. In some instances, the photodetector array may be a photodiode array having N photodiodes. The modulator component in these embodiments may include N transimpedance amplifiers and an array of N×N switches. In some embodiments, N is 8. In other embodiments, N is 16. In other embodiments, N is 32. In other embodiments, N is 64. In other embodiments, N is 128.

Systems for Detecting Light from Particles in a Sample by Spectral Discrimination Aspects of the present disclosure include systems for detecting light from a particle in a flow stream by spectral discrimination. In certain embodiments, systems provide for the differential detection of a spectrum of wavelengths of light from an irradiated particle, where in certain instances the differential detection of the spectrum of light from an irradiated particle may be used to identify or characterize the particle or component thereof. The subject systems are configured to detect a plurality of different wavelengths of light emanating from an irradiated particle, where in some instances one or more data signals is generated in response to each different detected wavelength of light.

In embodiments, systems include a light detection system as described herein having a wavelength separator component configured to propagate light between a first set of linear variable optical filters and a second set of linear variable optical filters where each set of linear variable optical filters is configured to pass light having predetermined sub-spectral ranges and a plurality of photodetectors positioned to detect light from each sub-spectral range across the linear variable optical filters. In some embodiments, systems include an optical collection system for conveying light to the light detection system, such as from an irradiated flow stream.

Each optical collection system may be any suitable light collection protocol that collects light from the irradiated sample and directs the light to the first set of linear variable optical filters of the light detection system. In some embodiments, the optical collection system includes fiber optics, such as a fiber optics light relay bundle. In other embodiments, the optical collection system is a free-space light relay system.

In embodiments, each optical collection system may be physically coupled to the light detection system, such as with an adhesive, co-molded together or integrated into each light detection module. In certain embodiments, the light detection system and optical collection system are integrated into a single unit. In some instances, the light detection system is coupled to an optical collection system with an connector that fastens the optical collection system to each light detection module, such as with a hook and loop fasteners, magnets, latches, notches, countersinks, counterbores, grooves, pins, tethers, hinges, Velcro, non-permanent adhesives or a combination thereof.

In other embodiments, the light detection system and optical collection system are in optical communication, but are not physically in contact. In embodiments, the optical collection system may be positioned 0.001 mm or more from the light detection system, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the light detection module.

In certain embodiments, the optical collection system includes fiber optics. For example, the optical collection system may be a fiber optics light relay bundle and light from the sample is conveyed through the fiber optics light relay bundle to the first set of linear variable optical filters of the light detection system. Any fiber optics light relay system may be employed to convey light, where in certain embodiments, suitable fiber optics light relay systems include, but are not limited to, fiber optics light relay systems such as those described in U.S. Pat. No. 6,809,804, the disclosure of which is herein incorporated by reference.

In other embodiments, the optical collection system is a free-space light relay system. The phrase "free-space light relay" is used herein in its conventional sense to refer to light propagation that employs a configuration of one or more optical components to direct light from the sample to the light detection system through free-space. In certain embodiments, the free-space light relay system includes a housing having a proximal end and a distal end, the proximal end being coupled to the light detection module. The free-space relay system may include any combination of different optical components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, suitable free-space light relay systems for propagating light from the sample to the first set of linear variable optical filters of the light detection system include, but are not limited to, light relay systems such as those described in U.S. Pat. Nos. 7,643,142; 7,728,974 and 8,223,445, the disclosures of which is herein incorporated by reference.

Systems of interest for measuring light from a sample include a light source. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

The light source may be positioned any suitable distance from the sample (e.g., the flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or. In addition, the light source irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The light source may be configured to irradiate the sample continuously or in discrete intervals. In some instances, systems include a light source that is configured to irradiate the sample continuously, such as with a continuous wave laser that continuously irradiates the flow stream at the interrogation point in a flow cytometer. In other instances, systems of interest include a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer controlled beam stops for blocking and exposing the sample to the light source.

In certain embodiments, systems further include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 μL/min (microliter per minute) or more, such as 2 μL/min or more, such as 3 μL/min or more, such as 5 μL/min or more, such as 10 μL/min or more, such as 25 μL/min or more, such as 50 μL/min or more, such as 75 μL/min or more, such as 100 μL/min or more, such as 250 μL/min or more, such as 500 μL/min or more, such as 750 μL/min or more and including 1000 μL/min or more. For example, the system may include a pump that is configured to flow sample through the flow cell at a rate that ranges from 1 μL/min to 500 μL/min, such as from 1 μL/min to 250 μL/min, such as from 1 μL/min to 100 μL/min, such as from 2 μL/min to 90 μL/min, such as from 3 μL/min to 80 μL/min, such as from 4 μL/min to 70 μL/min, such as from 5 μL/min to 60 μL/min and including rom 10 μL/min to 50 μL/min. In certain embodiments, the flow rate of the flow stream is from 5 μL/min to 6 μL/min.

In certain embodiments, the subject systems are flow cytometric systems. Suitable flow cytometry systems may include, but are not limited to, those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol*, 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,585,031; 10,578,542; 10,578,469; 10,481,074; 10,302,545; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In some embodiments, the subject systems are particle sorting systems that are configured to sort particles with an enclosed particle sorting module, such as those described in U.S. Patent Publication No. 2017/0299493, the disclosure of which is incorporated herein by reference. In certain embodiments, particles (e.g, cells) of the sample are sorted using a sort decision module having a plurality of sort decision units, such as those described in U.S. Patent Publication No. 2020/0256781, the disclosure of which is incorporated herein by reference. In some embodiments, the subject systems include a particle sorting module having deflector plates, such as described in U.S. Patent Publication No. 2017/0299493, filed on Mar. 28, 2017, the disclosure of which is incorporated herein by reference.

In certain instances, flow cytometry systems of the invention are configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; and U.S. Patent Publication Nos. 2017/0133857; 2017/0328826; 2017/0350803; 2018/0275042; 2019/0376895 and 2019/0376894 the disclosures of which are herein incorporated by reference.

Figure 4A:
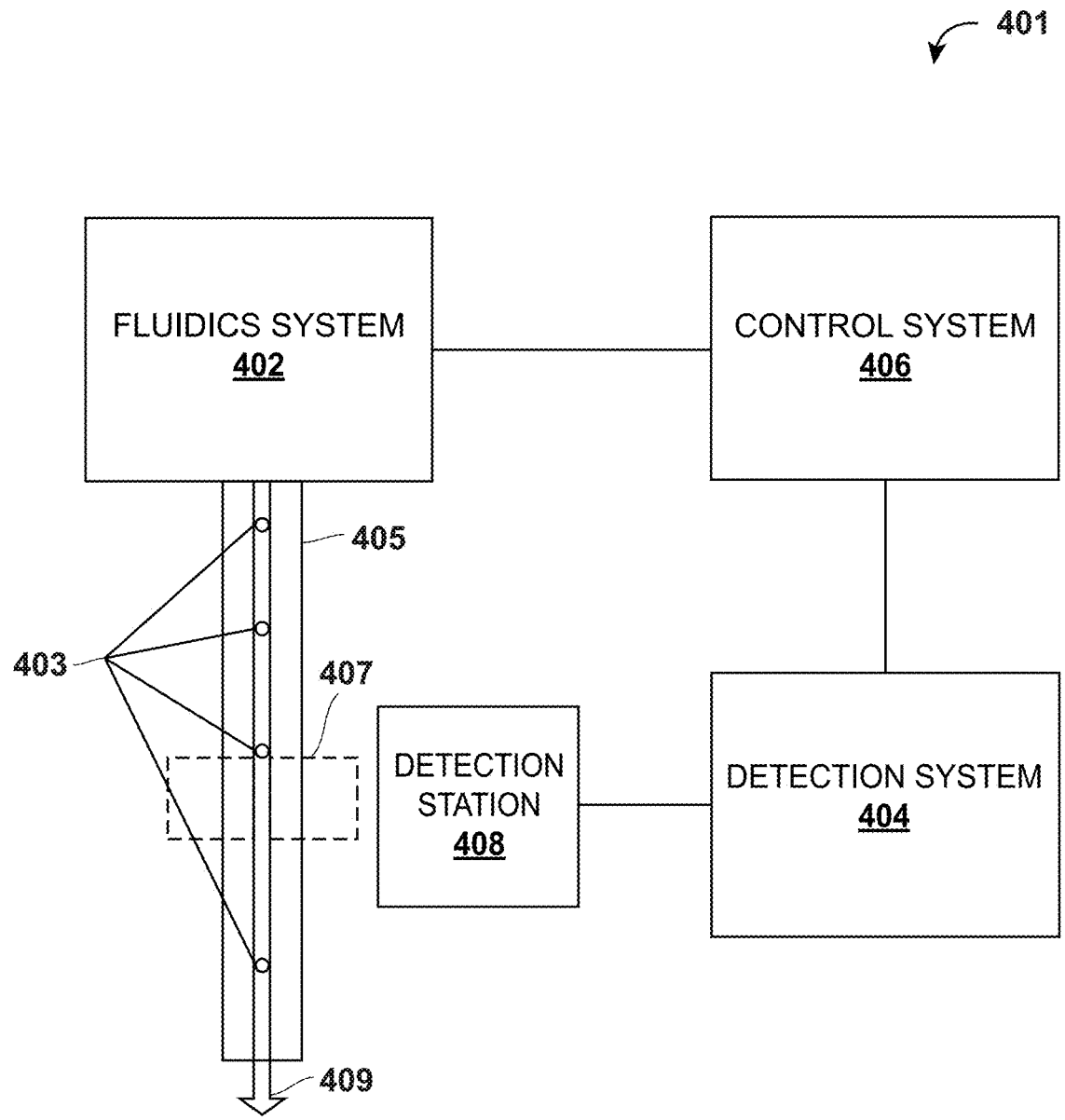
FIG. 4A depicts a functional block diagram of a particle analysis system according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
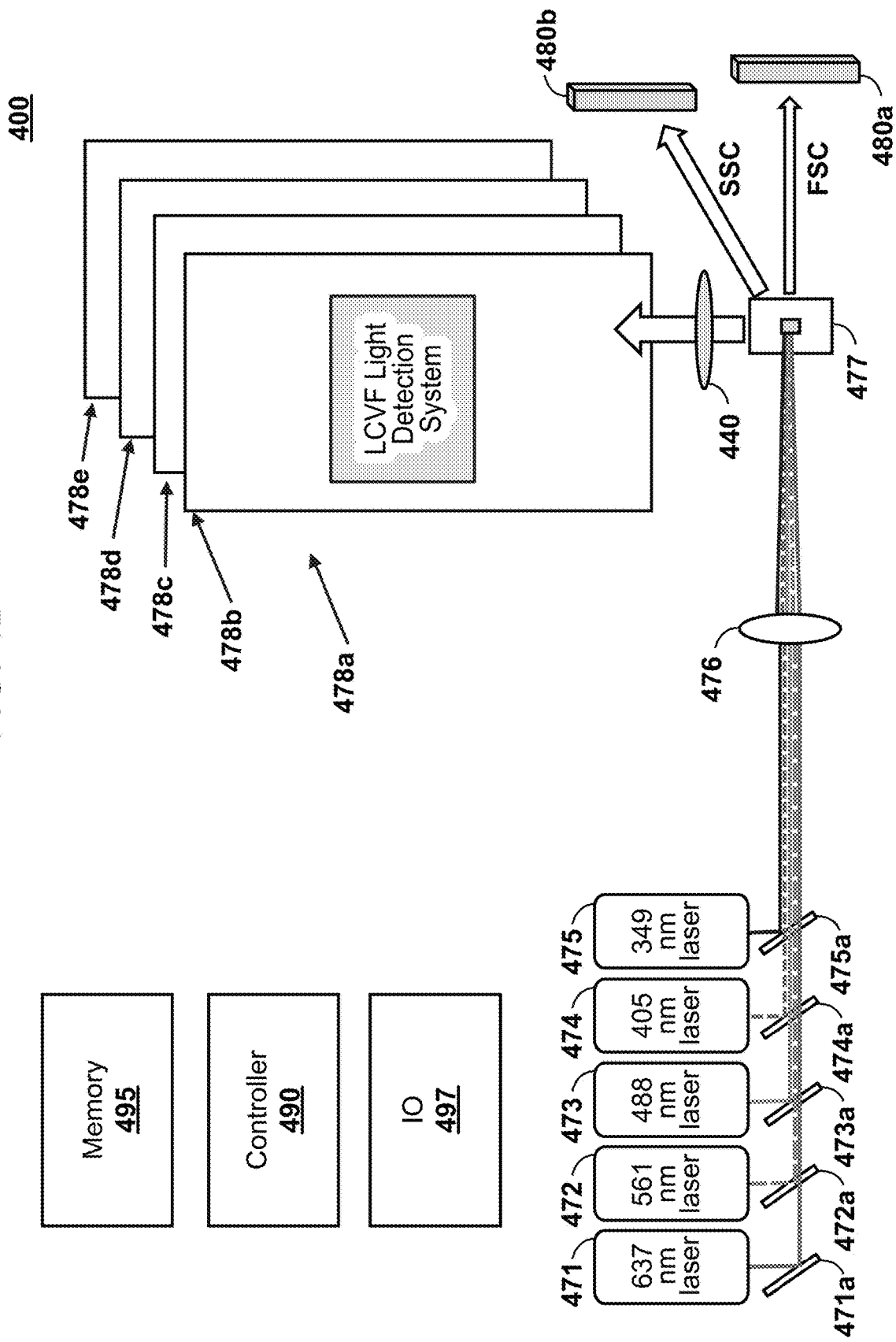
FIG. 4B depicts a flow cytometer system having a light detection system according to certain embodiments.

FIG. 4B shows a system for flow cytometry in accordance with an illustrative embodiment of the present invention. The system includes a flow cytometer 400, a controller/processor 490a and a memory 495a. The flow cytometer 470 includes one or more excitation lasers 471, 472, 473, 474 and 475, a focusing lens 476, a flow chamber 477, a forward scatter detector 480a, a side scatter detector 480b and a fluorescence collection lens 440.

The excitation lasers 471, 472, 473, 474 and 475 emit light in the form of a laser beam. The wavelengths of the laser beams emitted from excitation lasers 471, 472, 473, 474 and 475 are 637 nm, 561 nm, 488 nm, 405 nm and 349 nm, respectively, in the example system of FIG. 4B. The laser beams are first directed through one or more of beam splitters 471a, 472a, 473a, 474a and 475a. Beam splitter 475a transmits light at 637 nm, 561 nm, 488 nm and 405 nm and reflects light at 349 nm. Beam splitter 474a transmits light at 637 nm, 561 nm and 488 nm and reflects light at 405 nm. Beam splitter 473a transmits light at 637 nm and 561 nm and reflects light at 488 nm. Beam splitter 472a transmits light at 637 nm and reflects light at 561 nm. Beam splitter 471a reflects light at 637 nm. The laser beams are then directed to a focusing lens 476, which focuses the beams onto the portion of a fluid stream where particles of a sample are located, within the flow chamber 477. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 480a, the side scatter detector 480b, and to one or more of light detection systems 478a, 478b, 478c, 478d and 478e through fluorescence collection lens 440. In certain embodiments, light from flow cell 477 is collected with an optical collection component such as fiber optics or a free-space relay device as described above and propagated to one or more of light detection systems 478a, 478b, 478c, 478d and 478e.

The light from particles irradiated by each laser according to certain embodiments is detected with a distinct light detection system as described herein. As illustrated in FIG. 3, each light detection system includes a wavelength separator component configured to propagate light between a first set of linear variable optical filters and a second set of linear variable optical filters where each set of linear variable optical filters is configured to pass light having predetermined sub-spectral ranges and a plurality of photodetectors positioned to detect light from each sub-spectral range across the linear variable optical filters. In FIG. 4B, light detection module 478a is configured to detect light from particles propagating through flow cell 477 that are irradiated with laser 471 (e.g., with the 637 nm laser); light detection module 478b is configured to detect light from particles propagating through flow cell 477 that are irradiated with laser 472 (e.g., with the 561 nm laser); light detection module 478c is configured to detect light from particles propagating through flow cell 477 that are irradiated with laser 473 (e.g., with the 488 nm laser); light detection module 478d is configured to detect light from particles propagating through flow cell 477 that are irradiated with laser 474 (e.g., with the 405 nm laser); and light detection module 478e is configured to detect light from particles propagating through flow cell 477 that are irradiated with laser 475 (e.g., with the 349 nm laser). In the embodiment depicted in FIG. 4B a distinct light detection module is used to detect light from the flow stream from each laser line. In embodiments, the light detection modules may be arranged at any position and at any angle along the flow stream. In certain instances, as shown in FIG. 4B the light detection modules are positioned in a row along the longitudinal axis of the flow stream. Depending on the position of irradiation by each of the lasers, the light detection modules may be separated from each other along the longitudinal axis of the flow stream by 1 mm or more, such as by 5 mm or more, such as by 10 mm or more, such as 25 mm or more, such as 50 mm or more, such as 100 mm or more and including by 250 mm or more.

The forward scatter detector 480a is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 480b is configured to detect refracted and reflected light from the surfaces and internal structures of the particle, and tends to increase with increasing particle complexity of structure. The signals detected at the forward scatter detector 480a, the side scatter detector 480b and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 490 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with flow cytometer 400. The controller/processor 490 in conjunction with the memory 495 and the I/O 497 can be configured to perform various functions related to the preparation and analysis of a flow cytometer experiment.

The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
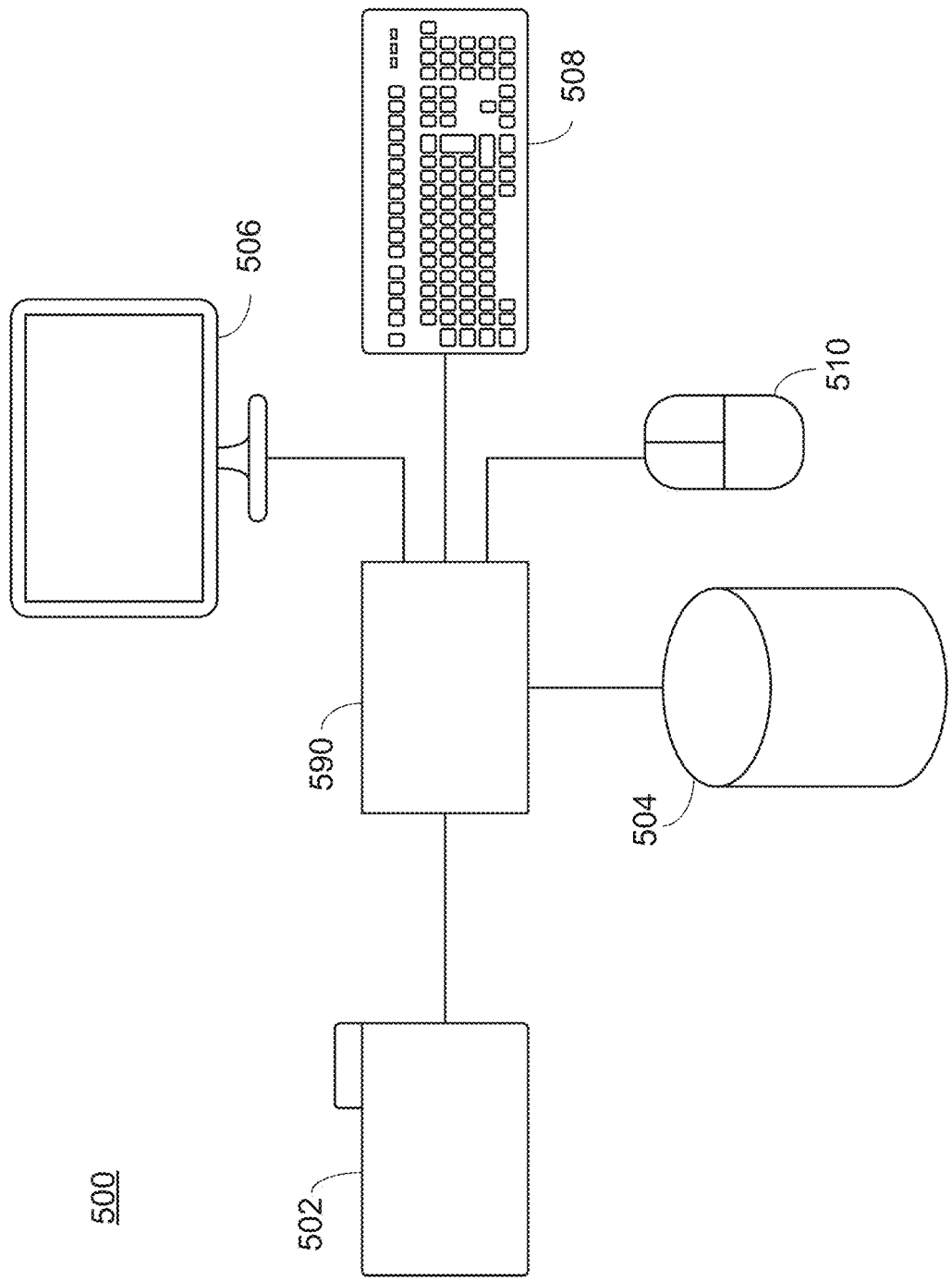
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
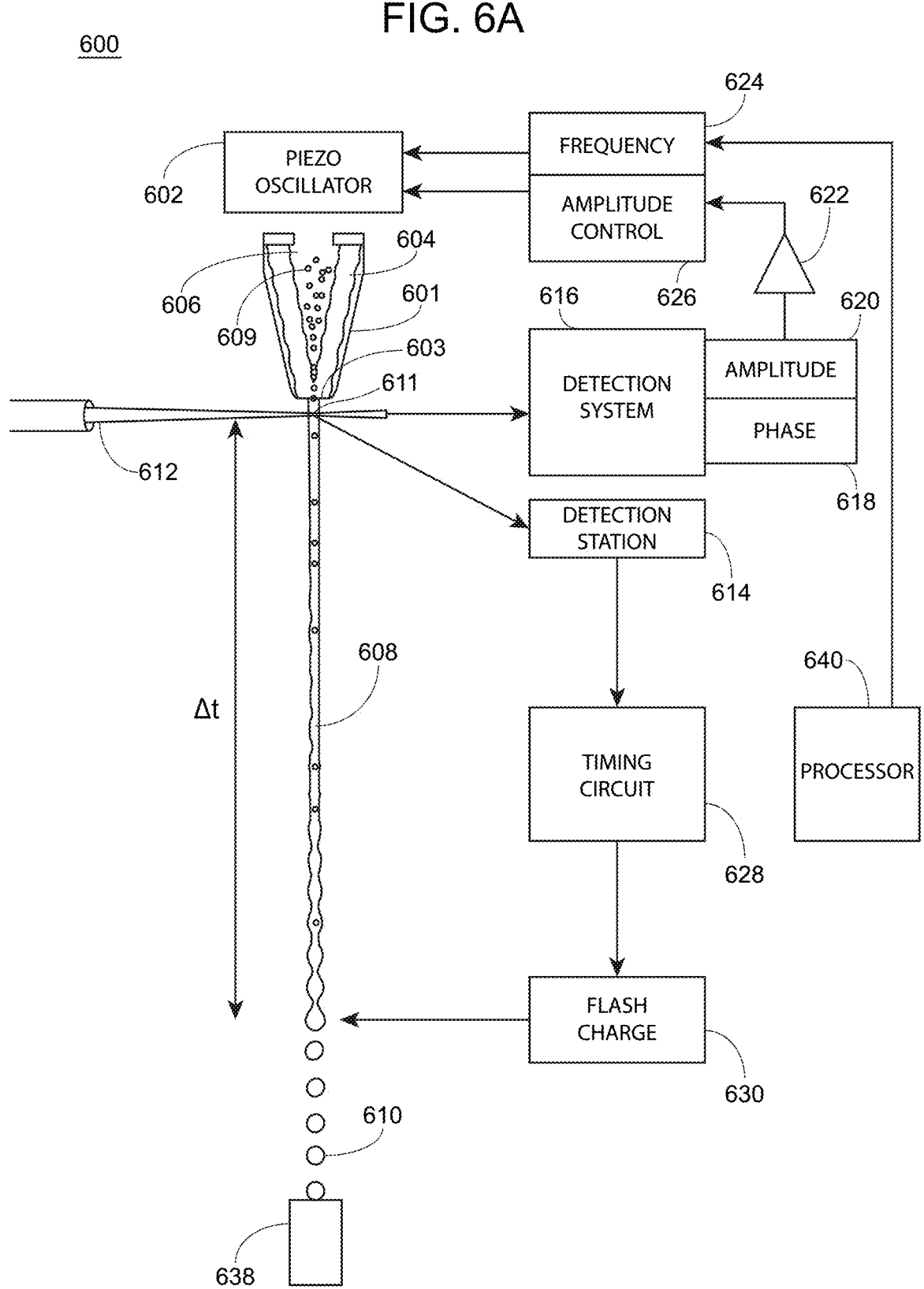
FIG. 6A depicts a schematic drawing of a particle sorter system according to certain embodiments.

FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g. a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (Δt), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g. a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
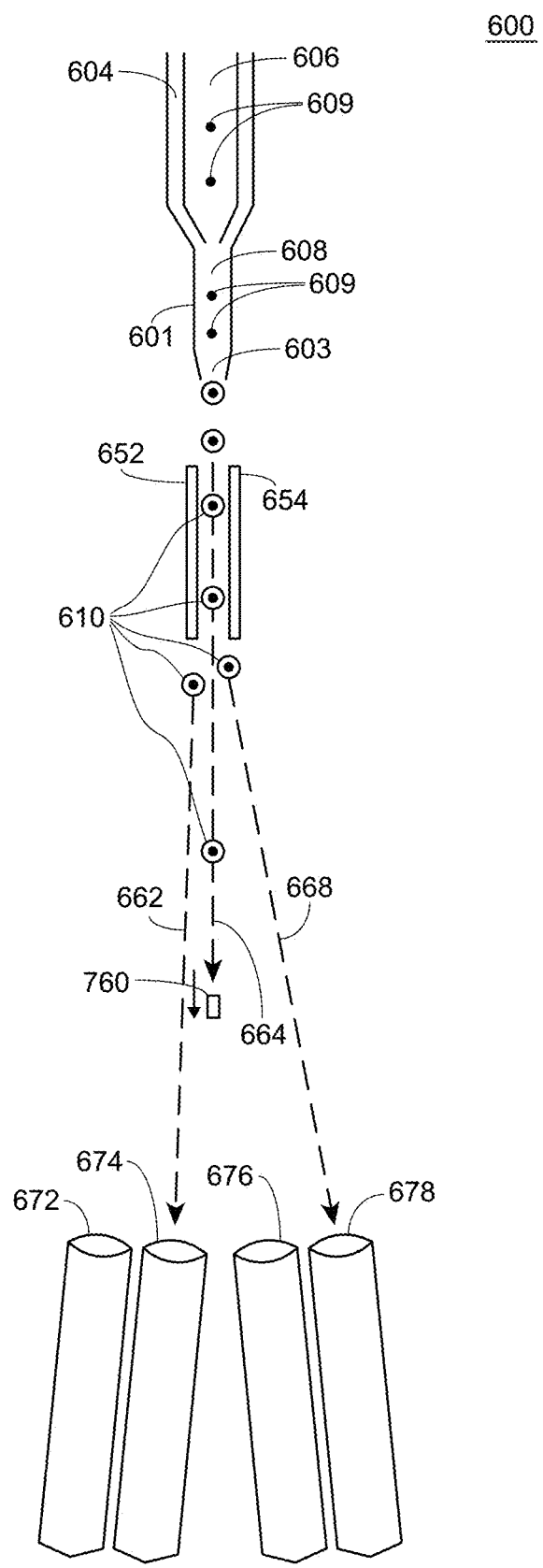
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for irradiating a particle propagating along a flow stream through an interrogation region with a light detection system having a wavelength separator component configured to propagate light between a first set of linear variable optical filters and a second set of linear variable optical filters where each set of linear variable optical filters is configured to pass light having predetermined sub-spectral ranges and a plurality of photodetectors positioned to detect light from each sub-spectral range across the linear variable optical filters.

In some embodiments, the computer controlled systems include memory having instructions stored thereon for binning data signal from different photodetector channels. In some embodiments, the computer program includes instructions for dynamically binning data signals from two or more different photodetector channels to generate a combined spectral data signal. In some instances, the computer program includes instructions for binning data signals from non-adjacent photodetectors. In some instances, the computer program includes instructions for binning data signals from adjacent photodetectors. In certain instances, the computer program includes instructions for horizontal binning of data signals from adjacent photodetectors. In some embodiments, the computer program includes instructions for binning data signals from three or more different photodetector channels, such as 4 or more, such as 5 or more, such as 6 or more, such as 16 or more, such as 32 or more and including from 64 or more different photodetector channels. In some embodiments, the binned data signals are wavelength separated data signals. In some embodiments, the binned data signals are time separated data signals. In some embodiments, the binned data signals are time and wavelength separated data signals.

In certain embodiments, the computer program includes instructions for amplifying data signals from one or more photodetector channels. In some instances, the computer program includes instructions for amplifying data signals from each photodetector channel and binning the amplified data signals. In some embodiments, the computer program includes instructions for multiplexing the generated data signals. In some instances, the computer program includes instructions for binning the multiplexed data signals.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Oracle Solaris, Linux, OS/400, Compaq Tru64 Unix, SGI IRIX, Siemens Reliant Unix, and others.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Methods for Detecting Light from Particles in a Flow Stream by Spectral Discrimination Aspects of the disclosure also include methods for measuring light from a sample (e.g., in the flow stream in a flow cytometer). In practicing methods according to embodiments, a sample is irradiated with a light source and light from the sample is detected with the light detection systems having a wavelength separator component configured to propagate light between a first set of linear variable optical filters and a second set of linear variable optical filters where each set of linear variable optical filters is configured to pass light having predetermined sub-spectral ranges and a plurality of photodetectors positioned to detect light from each sub-spectral range across the linear variable optical filters as described above. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

As discussed in detail above, in embodiments light from the irradiated sample is conveyed to a light detection system as described herein and detected by the plurality of photodetectors. Light may be measured with the light detection systems continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include adjusting the light before detecting the light with the subject light detection systems. For example, the light from the sample source may be passed through one or more lenses, mirrors, pinholes, slits, gratings, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

Kits

Kits including one or more components of the subject light detection systems are also provided. Kits according to certain embodiments, include a first set of linear variable optical filters, a second set of linear variable optical filters and a photodetector. In some embodiments, one or more of the linear variable optical filters is a linear variable bandpass filter such as a long pass linear variable bandpass filter or a short pass linear variable bandpass filter. In some instances, kits include an optical collection component, such as a fiber optics light relay bundle or a free-space light relay system. Kits may also include one or more photodetectors, such as photomultiplier tubes (e.g., metal package photomultiplier tubes) or photodiodes (e.g., avalanche photodiodes, APDs).

Kits may also include a flow cell nozzle as well as a cuvette for irradiating the flow stream. Kits may also include an optical adjustment component, such as lenses (e.g., a focusing lens, objective lens), mirrors, filters, fiber optics, wavelength separators, pinholes, slits, collimating protocols and combinations thereof. In certain instances, kits include one or more light sources, such as a laser, an LED, a broadband light source or a combination thereof.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and computer systems find use in a variety of applications where it is desirable to optimize particle identification, characterization and sorting. The subject methods and systems provide for detecting light using spectral discrimination and for identifying or characterizing a particle in a flow stream. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A light detection system comprising:
a wavelength separator component configured to propagate light between a first set of linear variable optical filters and a second set of linear variable optical filters, wherein each set of linear variable optical filters is configured to pass light having predetermined sub-spectral ranges across the linear variable optical filters and to reflect light between the first set of linear variable optical filters and the second set of linear variable optical filters; and
a plurality of photodetectors positioned to detect light from each sub-spectral range across the linear variable optical filters.

2. The light detection system according to claim 1, wherein each set of linear variable optical filters comprises a long pass linear variable bandpass filter and a short pass linear variable bandpass filter.

3. The light detection system according to claim 2, wherein the long pass variable bandpass filter is offset from a short pass linear variable bandpass filter by a predetermined distance in each set of linear variable optical filters.

4. The light detection system according to claim 3, wherein the sub-spectral ranges of light across each set of linear variable optical filters are determined by the offset of the long pass variable bandpass filter from the short pass linear variable bandpass filter.

5. The light detection system according to claim 1, wherein each sub-spectral range of light passed across the set of linear variable optical filters comprises a spectral width of from 5 nm to 50 nm.

6. The light detection system according to claim 1, wherein the first set of linear variable optical filters and the second set of linear variable optical filters are positioned along two parallel planes.

7. The light detection system according to the claim 6, wherein the wavelength separator component is configured to convey light back-and-forth between the first set of linear variable optical filters and the second set of linear variable optical filters.

8. The light detection system according to claim 1, wherein the wavelength separator component is configured such that:
the first set of linear variable optical filters are configured to pass light from low wavelengths to high wavelengths across the linear variable optical filters; and
the second set of linear variable optical filters are configured to pass light from high wavelengths to low wavelengths across the linear variable optical filters.

9. The light detection system according to claim 1, wherein the plurality of photodetectors are positioned across each set of linear variable optical filters.

10. The light detection system according to claim 9, where the light detection system comprises:
a first set of photodetectors positioned across the first set of linear variable optical filters, wherein the first set of photodetectors are configured to detect light having a sub-spectral range of from:
a) 500 nm to 520 nm;
b) 520 nm to 540 nm;
c) 540 nm to 560 nm;
d) 560 nm to 580 nm;
e) 580 nm to 600 nm;
f) 600 nm to 620 nm;
g) 620 nm to 640 nm;
h) 640 nm to 660 nm; and
a second set of photodetectors positioned across the second set of linear variable optical filters, wherein the second set of photodetectors are configured to detect light having a sub-spectral range of from:
a) 800 nm to 780 nm;
b) 780 nm to 760 nm;
c) 760 nm to 740 nm;
d) 740 nm to 720 nm;
e) 720 nm to 700 nm;
f) 700 nm to 680 nm;
g) 680 nm to 660 nm.

11. The light detection system according to claim 1, wherein the plurality of photodetectors comprise a modulator component configured to bin data signals from two or more different photodetector channels.

12. The light detection system according to claim 11, wherein each photodetector channel is configured to generate data signals for each sub-spectral range of light.

13. The light detection system according to claim 11, wherein the modulator component is configured for binning data signals from adjacent photodetector channels.

14. The light detection system according to claim 13, wherein the modulator component is configured for horizontal binning of adjacent photodetector channels.

15. The light detection system according to claim 12, wherein the modulator component is configured for binning data signals from three or more different photodetector channels.

16. The light detection system according to claim 12, wherein the modulator component comprises an output modulator configured to modulate signal output from each photodetector channel.

17. The light detection system according to claim 16, wherein the output modulator comprises an amplifier.

18. The light detection system according to claim 17, wherein the amplifier is a transimpedance amplifier.

19. The light detection system according to claim 16, wherein the output modulator comprises a switch circuit or a differential amplifier.

20. The light detection system according to claim 11, wherein the modulator component is configured to multiplex the generated data signals.

\* \* \* \* \*